United States Patent
Siemssen

(10) Patent No.: US 11,269,784 B1
(45) Date of Patent: Mar. 8, 2022

(54) SYSTEM AND METHODS FOR EFFICIENT CACHING IN A DISTRIBUTED ENVIRONMENT

(71) Applicant: Amazon Technologies, Inc., Seattle, WA (US)

(72) Inventor: Bradford William Siemssen, Federal Way, WA (US)

(73) Assignee: Amazon Technologies, Inc., Seattle, WA (US)

( * ) Notice: Subject to any disclaimer, the term of this patent is extended or adjusted under 35 U.S.C. 154(b) by 179 days.

(21) Appl. No.: 16/455,367

(22) Filed: Jun. 27, 2019

(51) Int. Cl.
| | | |
|---|---|---|
| *G06F 12/12* | (2016.01) | |
| *G06F 12/121* | (2016.01) | |
| *G06F 16/172* | (2019.01) | |
| *G06F 12/0808* | (2016.01) | |
| *G06F 12/0815* | (2016.01) | |

(52) U.S. Cl.
CPC ........ *G06F 12/121* (2013.01); *G06F 12/0808* (2013.01); *G06F 12/0815* (2013.01); *G06F 16/172* (2019.01)

(58) Field of Classification Search
None
See application file for complete search history.

(56) References Cited

U.S. PATENT DOCUMENTS

| | | | | |
|---|---|---|---|---|
| 8,650,266 B2* | 2/2014 | Cohen | ............... | H04L 67/1095 709/219 |
| 9,369,332 B1* | 6/2016 | Smith | ............... | H04L 67/2842 |
| 2003/0188106 A1* | 10/2003 | Cohen | ............... | H04L 67/1095 711/133 |
| 2005/0015463 A1* | 1/2005 | Smith | ............... | G06F 16/9574 709/219 |
| 2008/0114942 A1* | 5/2008 | Brown | ............... | G06F 12/0875 711/144 |
| 2013/0086132 A1* | 4/2013 | Hunt | ............... | G06F 12/0253 707/819 |
| 2013/0086323 A1* | 4/2013 | Kadlabalu | ........... | G06F 16/9574 711/119 |
| 2013/0159631 A1* | 6/2013 | Seufert | ............... | G06F 16/00 711/141 |
| 2015/0341422 A1* | 11/2015 | Farnlof | ............... | G06F 9/544 709/202 |
| 2017/0329708 A1* | 11/2017 | Murugesan | ......... | G06F 12/0802 |
| 2018/0143905 A1* | 5/2018 | Roberts | ............... | G06F 12/0822 |
| 2021/0064475 A1* | 3/2021 | Baker | ............... | G06F 11/1469 |

OTHER PUBLICATIONS

"Time, Clocks and the Ordering of Events in a Distributed System", Communications of the ACM, 21(7), pp. 558-565 (1978) (Year: 1978).*

* cited by examiner

Primary Examiner — Tracy C Chan
(74) Attorney, Agent, or Firm — Knobbe, Martens, Olson & Bear, LLP

(57) ABSTRACT

Systems and methods are provided for efficiently managing a cache in a distributed environment. When entries are written into a cache, the entries include dependency information. The distributed system keeps invalidation entries that keep track of what dependent values have change and enforces invalidation of entries on cache reads. An asynchronous process actively invalidates entries and garbage collects the invalidation entries. The distributed system advantageously allows writing and reading cached entries across service boundaries.

19 Claims, 8 Drawing Sheets

SYSTEM AND METHODS FOR EFFICIENT CACHING IN A DISTRIBUTED ENVIRONMENT

BACKGROUND

In a computer context, a cache may be used to store content. The cache can be an in-memory key-value database with fast retrieval capabilities. The cache can be a distributed cache. A distributed cache can include multiple replicated database instances and/or horizontally partitioned data across multiple database instances. A cache entry can include a time-to-live, such that when the time-to-live expires, the cache entry can be evicted from the cache.

BRIEF DESCRIPTION OF THE DRAWINGS

These and other features, aspects and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters can denote corresponding features throughout similar embodiments. The following is a brief description of each of the drawings.

DETAILED DESCRIPTION

Figure 1A:
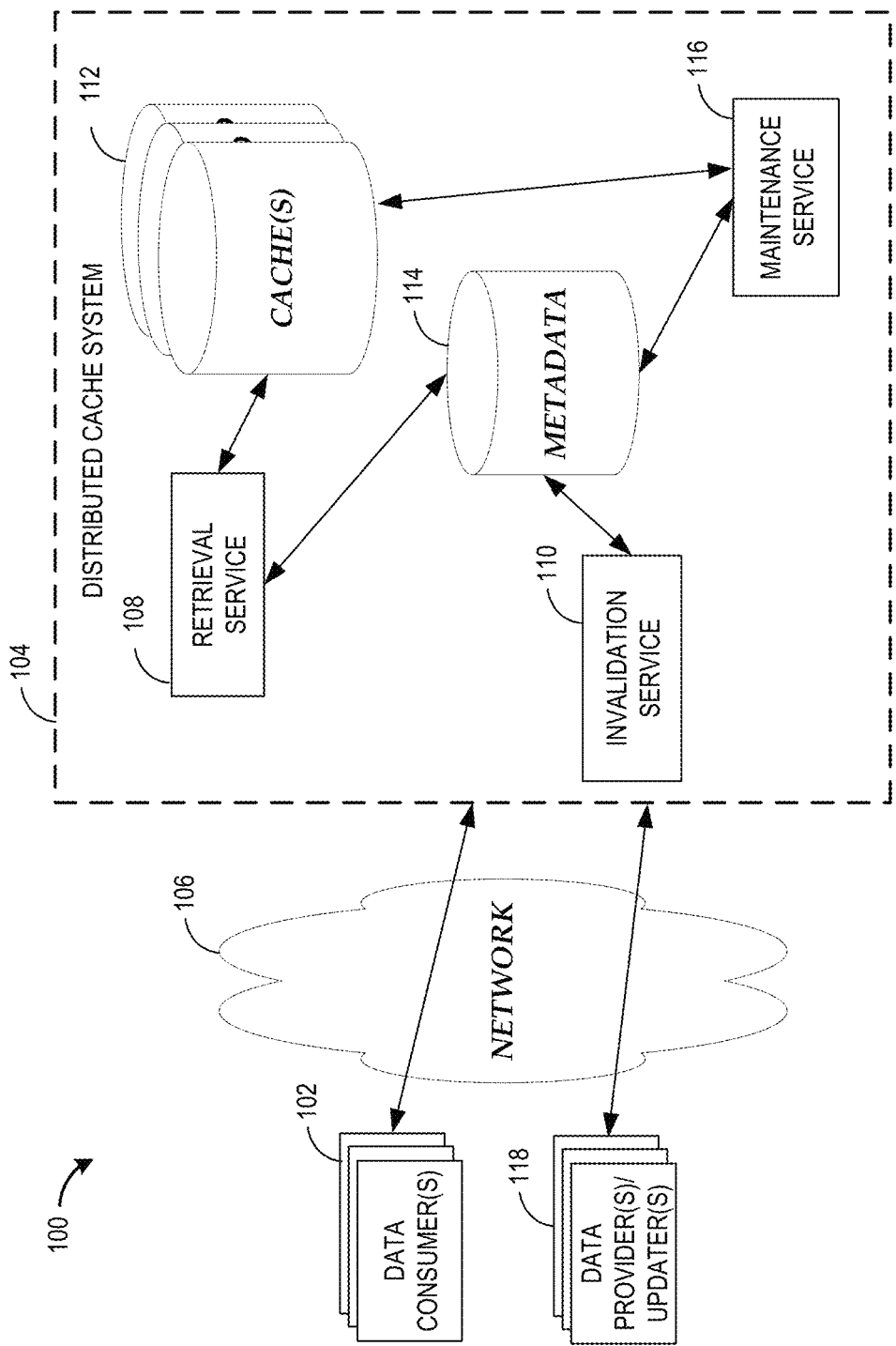
FIG. 1A is a schematic block diagram depicting an illustrative network environment for implementing a distributed cache system to efficiently manage cache entries.

Generally described, aspects of the present disclosure are directed to system and methods for efficiently managing cache(s) in a distributed environment. For example, a distributed cache system can receive a request from a client for an entry. Upon receiving the request, the distributed cache system can access the requested entry from the distributed cache. The distributed cache system can apply validity logic to determine whether to return the entry, report a cache miss, evict the entry from the cache, return a new entry, and/or store the new entry in the cache. The distributed cache system can access metadata for the requested entry. The metadata can include dependency information that indicates dependencies for the requested entry. The dependencies can be used for validity purposes. The requested entry can depend on or more other data items, such as other entries. The distributed cache system can check an invalidation status of the one or more other data items. If the other data items are determined to not be invalid and/or other validity logic is satisfied, then the requested entry can be returned.

As described above, some existing cache solutions have a time-to-live feature to address data freshness. For example, one or more cache entries can have a time-to-live setting of a time period, such as 10 minutes, which may be the maximum period that clients of the distribute cache are willing to accept stale entries. After the time period has elapsed, the one or more cache entries will be evicted from the cache. Repopulating the evicted cache entries can be expensive. Repopulating a cache entry may require making a service call to compute a cache value, which can be slow and/or can implicate network latency. The cache may have a large number of entries, such as hundreds of thousands, millions, or billions of entries. However, the frequency of actual invalidations of entries may be relatively low in contrast to the total number of entries in the cache. For example, for a distributed cache with 1.5 billion entries, there may be a few thousand updates per minute to data items corresponding to entries in the distributed cache. Accordingly, the frequency rate of updates per data item can be relatively low. In some instances, there can be a high rate of updates to data, but for any individual piece of data, the individual piece of data changes infrequently. Reliance on time-to-live features, such as timers, can result in throwing away cache entries too soon or, conversely, the timer can be set for much longer, which results in stale data and no way to know that the data is stale. Thus, in some situations, reliance on time-to-live features in a cache can be inefficient.

In the central processing unit (CPU) computer architecture context, some existing technologies exist for multiprocessors that provide cache coherence functionality. Cache coherence can be the maintenance of uniform shared resource data that can be stored in multiple caches. In the CPU context, the shared resource data can be stored in multiple local caches. Also in the CPU context, cache coherence can depend on hardware primitives and/or the ability to let one processor execute and block the remaining processors to resolve the concurrency issues and/or cache coherence issues. These features, such as primitives and/or the control over multiple writing/accessing entities, may not be available in a distributed environment with multiple distinct computing devices, clients, and/or servers. Thus, some aspects and/or specific solutions to cache coherence in the CPU context may not be applicable to caching in a distributed environment.

The systems and methods described herein may improve computer technology and/or may be intrinsically tied to database and/or cache technologies. Instead of or in addition to existing approaches to address data freshness issues in caches, such as time-to-live features that indiscriminately invalidate cache entries, the solutions described herein can implement near-time invalidation features, such as just-in-time invalidation. Unlike some existing solutions, the cache systems and caching methods described herein can keep track of what data has changed and can determine the validity or an approximate validity of cached data when a cache entry is requested. Thus, the systems and methods described herein can be more efficient than existing solutions by resulting in less cache misses and/or using reduced computing resources since there may be less indiscriminate cache evictions and/or less service calls to repopulate data due to cache misses. In particular, for entries that do not actually have updates, the system may keep those entries in the cache; conversely, actual changes to entries may cause the system to evaluate entries in the cache. With the improved caching solutions described herein, a cache entry may be able to remain in the cache for months while still remaining fresh, instead of the same entry being evicted in minutes under a strict time-to-live model.

The systems and methods described herein may be intrinsically tied to network technology because such solutions may be related to communication over computer networks and/or may improve computer network communication technology. For example, the features described herein, such as just-in-time invalidation features, may decrease network bandwidth by resulting in reduced service calls over a network as described herein. The caching solutions described herein may also improve distributed caching or sharing of data between data providers and data consumers. Using the solutions described herein, a data provider can indicate when data is invalid by making an invalidation request. The distributed cache system described herein can serve as a coordination mechanism that signals data consumers that a data refresh may be necessary. The distributed cache system can allow a common mechanism for data consumers to know when data they depend on needs to be updated, such as by using a shared list of invalidation entries. The shared ability to know when data is not safe to use can eliminate a large barrier to sharing data between services. The common invalidation mechanism described herein can allow data providers to proactively populate cache entries and/or can enable the cache entries to be used by multiple clients using the same infrastructure. As a result, the systems described herein can provide the benefits a distributed, shared memory for multiple independent services. Service A can write entries into the cache and services B and C can read them out of the cache and use them.

Turning to FIG. 1A, an illustrative network environment 100 is shown in which a distributed cache system 104 may determine the validity of cache entries. The network environment 100 may include one or more data consumers 102, one or more data providers and/or updaters 118, and a distributed cache system 104. The distributed cache system 104 may include a retrieval service 108, one or more caches 112, an invalidation service 110, a maintenance service 116, and a metadata store 114. The constituents of the network environment 100 may be in communication with each other either locally or over a network 106.

The one or more data consumers 102 may be any computing device capable of communicating over the network 106 and requesting a cache entry, such as a client computing device. The one or more data consumers 102 may be agnostic to maintenance of a cache. The retrieval service 108 can receive a cache request from the one or more data consumers 102. While not illustrated, the retrieval service 108 can be implemented as a library or application that is executed locally by the one or more data consumers 102. The retrieval service 108 can access the requested entry from the one or more caches 112. The retrieval service 108 can apply validity logic to determine whether to return the entry or take some other action. The retrieval service 108 can access metadata for the requested entry from the metadata store 114. As described herein, the metadata can include dependency information that indicates dependencies for the requested entry. The retrieval service 108 can check an invalidation status of the dependencies. The retrieval service 108 can return the requested entry to the one or more data consumers 102 if the dependencies are determined to not be invalid and/or other validity logic is satisfied. The retrieval service 108 can also report a cache miss, evict an entry from the cache, make a service call to retrieve a new entry, return the new entry, and/or store the new entry in the distributed cache.

The one or more data providers and/or updaters 118 may be any computing device capable of communicating over the network 106 and writing or updating a cache entry. The one or more data providers and/or updaters 118 can notify the invalidation service 110 that one or more cache entries are invalid. The invalidation service 110 can be a listener service that receives notifications. The invalidation service 110 can write invalidation entries to the metadata store 114.

The maintenance service 116 can be responsible for purging data from the metadata store 114. The maintenance service 116 can execute asynchronously and/or independently of the retrieval service 108. As described herein, invalidation data can be written to the metadata store 114. The maintenance service 116 can selectively remove invalidation data from the metadata store 114 to prevent the invalidation data from growing unbounded. The maintenance service 116 can read invalidation entries from the metadata store 114. The maintenance service 116 can determine when an invalidation entry was written and can delete corresponding cache entries from the one or more caches 112 that are older than the invalidation entry. When the maintenance service 116 has completed a sweep of the invalidation entries, the maintenance service 116 can delete invalidation entries in the metadata store 114 that were added before the sweep began. In other words, the maintenance service 116 can purge invalidation entries that no longer have cache entries that are dependent on the respective invalidation entry.

The network 106 may be any wired network, wireless network, or combination thereof. In addition, the network 106 may be a personal area network, local area network, wide area network, cable network, satellite network, cellular telephone network, or combination thereof. In addition, the network 106 may be an over-the-air broadcast network (e.g., for radio or television) or a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks, such as HTTP. Protocols and components for communicating via the Internet or any of the other aforementioned types of communication networks are well known to those skilled in the art of computer communications and thus, need not be described in more detail herein.

The one or more caches 112 and/or the metadata store 114 may be embodied in hard disk drives, solid state memories, any other type of non-transitory computer-readable storage medium, and/or a file, a data store, a database, an object orientated database, a document store, a relational database, an in-memory cache, and/or stored in any such non-transitory computer-readable media accessible to the distributed cache system 104. The one or more caches 112 and/or the metadata store 114 may also be distributed or partitioned across multiple local and/or remote storage devices.

The one or more data consumers 102, the one or more data providers and/or updaters 118, and the distributed cache system 104 may each be embodied in a plurality of devices.

For example, one or more data consumers 102, the one or more data providers and/or updaters 118, and the distributed cache system 104 may include a network interface, memory, hardware processor, and non-transitory computer-readable medium drive, all of which may communicate with each other by way of a communication bus. The network interface may provide connectivity over the network 106 and/or other networks or computer systems. The hardware processor may communicate to and from memory containing program instructions that the hardware processor executes in order to operate the one or more data consumers 102, the one or more data providers and/or updaters 118, and the distributed cache system 104. The memory generally includes RAM, ROM, and/or other persistent and/or auxiliary non-transitory computer-readable storage media.

It will be recognized that many of the devices described above are optional and that embodiments of the environment 100 may or may not combine devices. Furthermore, devices need not be distinct or discrete. Devices may also be reorganized in the environment 100. For example, the one or more data consumers 102 and/or the retrieval service 108 may be represented in a single physical server or, alternatively, may be split into multiple physical servers. Additionally, the environment 100 may not include a network 106.

Additionally, in some embodiments, the distributed cache system 104 is implemented by one or more virtual machines implemented in a hosted computing environment. The hosted computing environment may include one or more rapidly provisioned and/or released computing resources. The computing resources may include hardware computing, networking and/or storage devices configured with specifically configured computer-executable instructions. A hosted computing environment may also be referred to as a "cloud" or distributed computing environment.

Figure 1B:
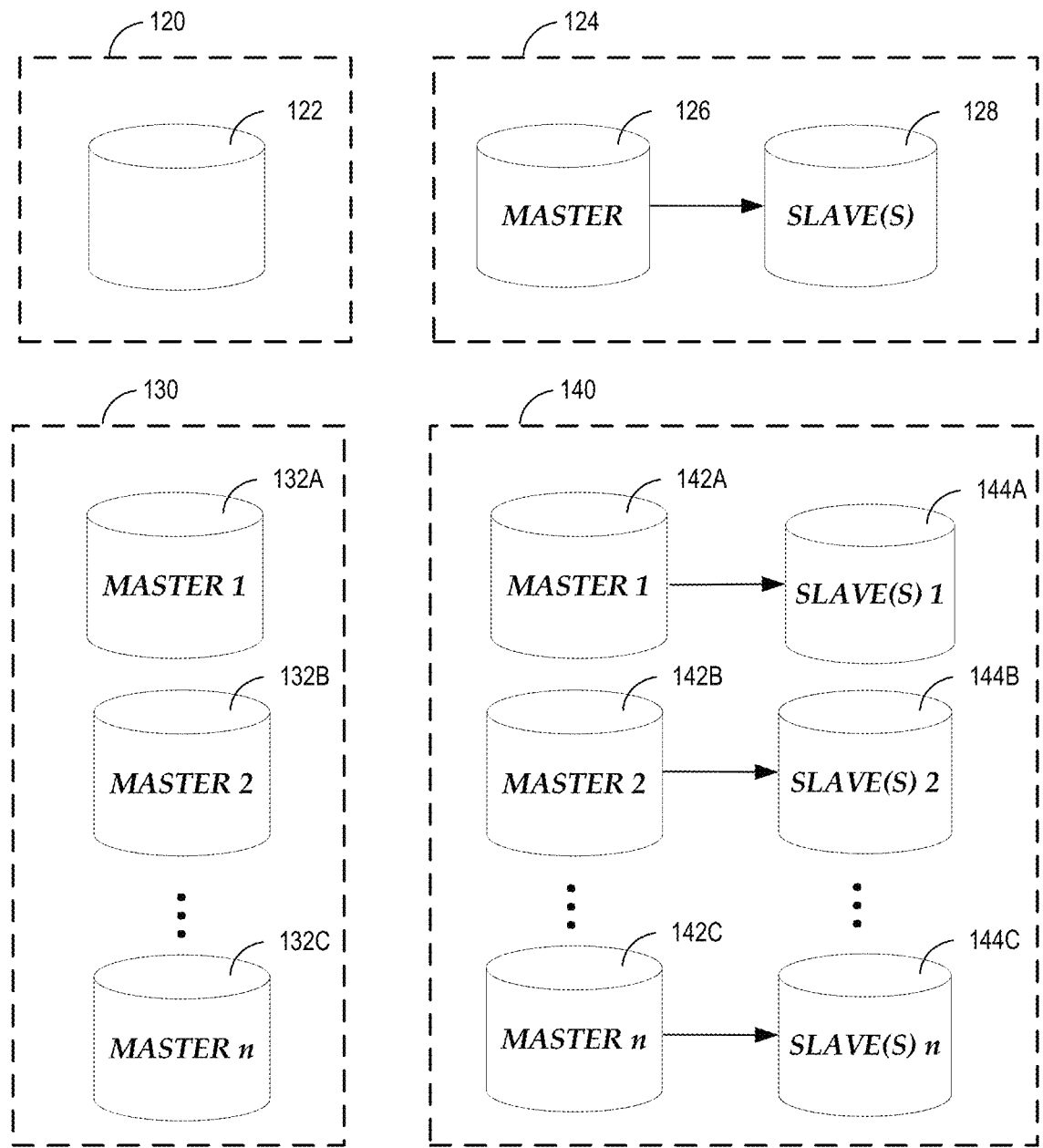
FIG. 1B is a schematic block diagram depicting an illustrative cache and/or database environment.

Turning to FIG. 1B, various illustrative cache and/or database environments 120, 124, 130, 140 are shown. The cache and/or database environments 120, 124, 130, 140 can be implemented with an in-memory database, such as, but not limited to, Redis™, Memcached, and/or ElastiCache™. The first database environment 120 can include a single database 122. The second database environment 124 can include a master database 126 and one or more replicated slave databases 128. The second database environment 124 can be a high availability database environment. The third database environment 130 can include horizontal partitions of data in the databases 132A, 132B, 132C, which can also be referred to as "shards" or "multi-sharded." The fourth database environment 140 can include multiple groups of horizontally partitioned databases 142A, 142B, 142C and respective one or more replicated slave databases 144A, 144B, 144C. The fourth database environment 140 can be a high availability database environment. As used herein, in addition to having its ordinary meaning, the term "cluster" or "clustered" can refer to replicated master/slave database environments, horizontal-partitioned database environments, and/or replicated horizontal-partitioned database environments, such as the second, third, and fourth database environments, respectively. The cache and/or database environments 120, 124, 130, 140 can be used in the distributed cache system 104 of FIG. 1A. For example, the one or more caches 112 and/or the metadata store 114 can be implemented in any of the cache and/or database environments 120, 124, 130, 140 of FIG. 1B.

Figure 2:
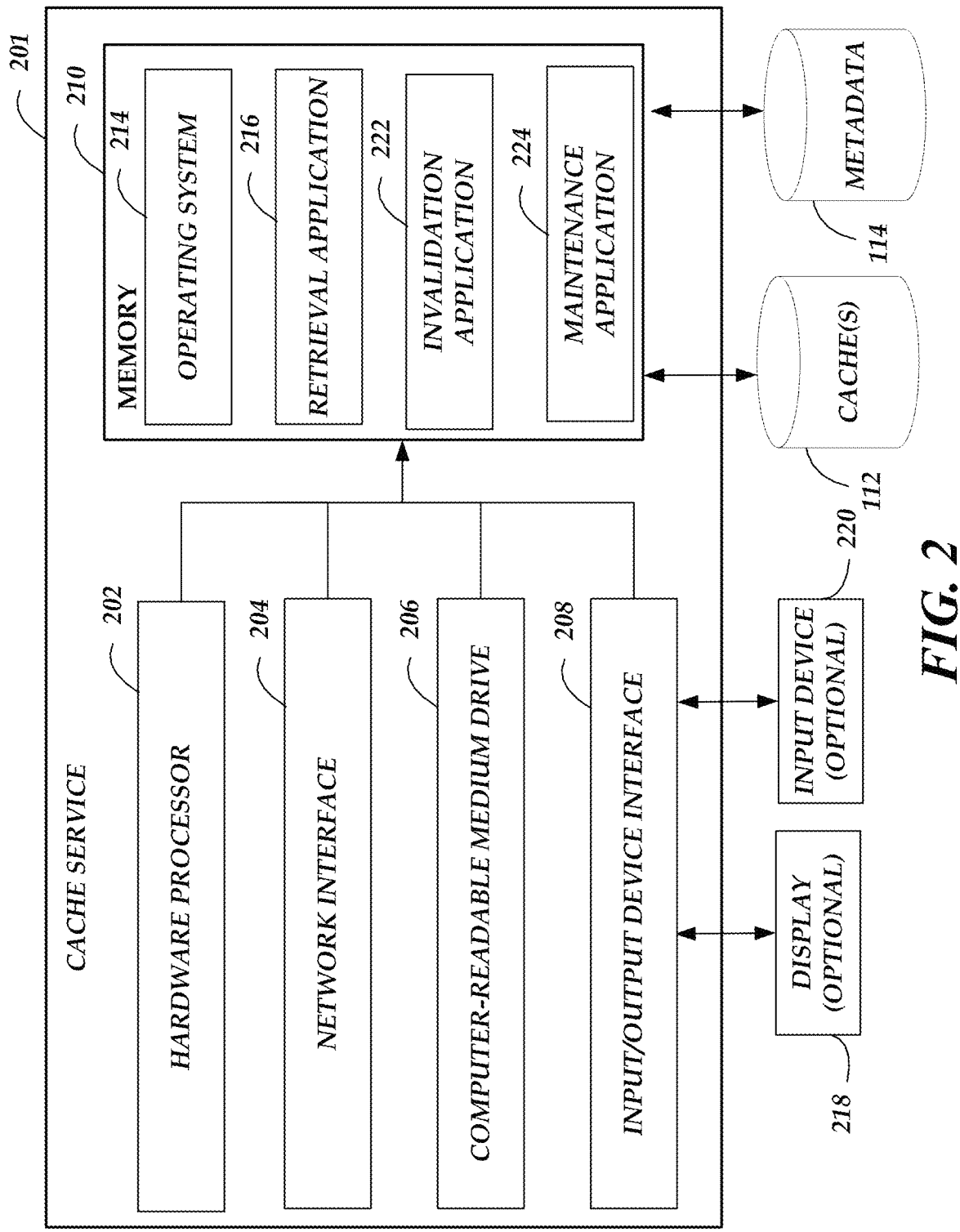
FIG. 2 is a schematic block diagram depicting an illustrative cache service of the network environment depicted in FIG. 1A.

FIG. 2 is a schematic diagram of an illustrative cache service 201 that can be used in the environment 100 in FIG. 1A. The cache service 201 includes an arrangement of computer hardware and software components that may be used to implement any of the retrieval service 108, the invalidation service 110, or the maintenance service 116 illustrated in FIG. 1A. FIG. 2 depicts a general architecture of any of the retrieval service 108, the invalidation service 110, or the maintenance service 116 illustrated in FIG. 1A. Those skilled in the art will appreciate that cache service 201 may include more (or fewer) components than those shown in FIG. 2. Further, other computing systems described herein may include similar implementation arrangements of computer hardware and software components.

The cache service 201 may include a hardware processor 202, a network interface 204, a non-transitory computer-readable medium drive 206, and an input/output device interface 208, all of which may communicate with one another by way of a communication bus. As illustrated, the cache service 201 is associated with, or in communication with, an optional display 218 and an optional input device 220. In other embodiments, the display 218 and input device 220 may be included in the one or more data consumers 102 shown in FIG. 1A or by a downstream computing device of the data consumer 102. The network interface 204 may provide the cache service 201 with connectivity to one or more networks or computing systems. The hardware processor 202 may thus receive information and instructions from other computing systems (such as the data consumers, providers, and/or updaters 102, 118) or services via network 106. The hardware processor 202 may also communicate to and from memory 210 and further provide output information for an optional display 218 via the input/output device interface 208. The input/output device interface 208 may accept input from the optional input device 220, such as a keyboard, mouse, digital pen, touch screen, accelerometer, gyroscope, or gestures recorded via motion capture and/or image recognition (e.g., eye, hand, head, and/or body part placement and/or recognition). The input/output device interface 220 may also output audio data to speakers or headphones (not shown).

The memory 210 may contain specifically configured computer program instructions that the hardware processor 202 executes in order to implement one or more embodiments of the cache service 201. The memory 210 generally includes RAM, ROM and/or other persistent or non-transitory computer-readable storage media. The memory 210 may store an operating system 214 that provides computer program instructions for use by the processing unit 202 in the general administration and operation of the cache service 201. The memory 210 may further include other information for implementing aspects of the cache service 201. For example, the memory 210 may communicate with the cache(s) 112 and/or the metadata store 114. In some embodiments, the cache(s) 112 and/or the metadata store 114 may store one or more data structures that can also be loaded into the memory 210.

The memory 210 may include one or more of the retrieval application 216, the invalidation application 222, or the maintenance application 224 that may be executed by the hardware processor 202. In some embodiments, the retrieval application 216, the invalidation application 222, and/or the maintenance application 224 may implement various aspects of the present disclosure. For example, the retrieval application 216 may determine whether an entry in a cache is valid or valid enough to be returned. The invalidation application 222 can write invalidation entries. The maintenance application 224 can clean up invalidation entries in the metadata store 114 and/or cache entries in the cache(s) 112.

The systems and methods described herein related to caching can be applied in an electronic commerce context, and, in particular, to tax calculation in an electronic commerce context. An electronic commerce network site may be required to calculate taxes for transactions, such as sales tax for a sales transaction. In some jurisdictions, there may be a requirement to display a price for an item for a particular customer before starting the checkout process. For example, an Austrian or a Belgian customer may be redirected to a German version of the electronic commerce network site since there may not be corresponding Austrian or a Belgian version of the network site. Without improved localized tax features, an electronic commerce network site may present German tax information to non-German customers. Thus, an improved electronic commerce network site can present Austrian tax information to the Austrian customer and Belgian tax information to the Belgian customer, etc., instead of German tax information to Austrian or a Belgian customers in the German version of the site.

However, determining accurate tax information for individual items and customer combinations can be non-trivial. Tax information may be computed based on specifics of the shipping destination of the item to the customer, information regarding the merchant, such as tax registrations, product classifications of the item, and other information, which can depend on local tax laws. Also, the tax information is computed based on the latest versions of the underlying data. In the tax data context, there can be a high rate of data change, but for any individual piece of tax data, the data may infrequently change. Computing tax information can be expensive, such as by invoking multiple services that each has latency. Service A may call Service B and Service C, and Service C may call Service D to determine some tax information.

Using the caching solutions described herein, the determined tax values can be cached, as well as the intermediary determined values. For example, the results of service A to service B, service A to service C, and service C to service D can be cached, and if anything actually updates any of the foregoing results, the system can invalidate those appropriate mappings; however, there is the advantageous possibility that a single cache reads and gets the answer, and returns it to the customer. Thus, caching tax information and, in particular, using distributed caches, can advantageously improve the retrieval times for tax information. Accordingly, the caching techniques described herein may be applied in a distributed context to efficiently retrieve tax information, although those skilled in the art will recognize that the caching techniques described herein can be used in a various other contexts without departing from the scope of the present disclosure.

Figure 3:
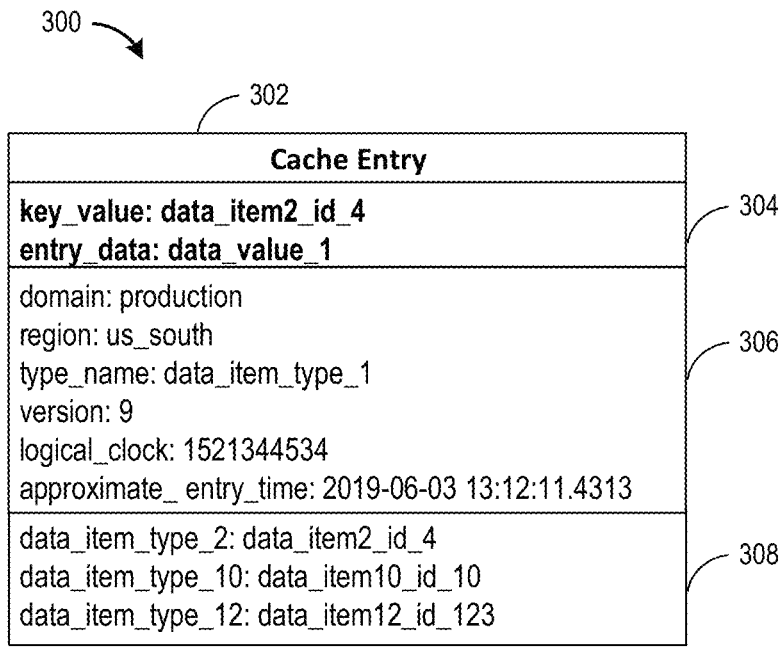
FIG. 3 is a schematic block diagram depicting an example cache entry.

FIG. 3 is a schematic block diagram depicting an example cache entry 302. The cache entry 302 can be stored in the one or more caches 112. The cache entry 302 can include multiple portions of data 304, 306, 308. The primary portion 304 of the cache entry 302 can include a key-value (here "data_item2_id_4") and entry data (here "data_value_1"). A data consumer 102 can request a cache entry for a particular key-value. For example, a data consumer 102 that requests "data_item2_id 4" from the one or more caches 112 can be receive the entry data, "data_value_1," from the one or more caches 112. A metadata portion 306 of the cache entry 302 can include metadata regarding the cache entry 302. A logical dependency portion 308 of the cache entry 302 can indicate that the particular cache entry 302 is dependent on zero or more other data items (here three data items: "data_item2_id 4" of type "data_item_type_2," "data_item10_id_10" of type "data_item_type_10," "data_item12 id 123" of type "data_item_type_12"). In some embodiments, the multiple portions of data 304, 306, 308 can be stored together. In other embodiments, some of the multiple portions of data 304, 306, 308 can be stored separately.

With respect to the metadata portion 306 of the cache entry 302, some of the metadata can be related to identifying a particular cluster or instance of a database, such as, the domain, region, type, or version in the metadata portion 306, which can be combined to generate a key-prefix, such as "production/us_south/data_item_type1/v9". The type of the cache entry 302 (here "data_item_type_1") can be used to facilitate Application Programming Interface (API) calls of data producers and/or updaters 118 that want to write data to the cache, since the type of the cache entry can specify the type of input values (such as the dependent values) that the data producers and/or updaters 118 may be required to provide to write an entry to the cache. The metadata portion 306 can include a logical clock value (here "1521344534"), which is described in further detail below.

The term "logical clock," as used herein, and in addition to having its ordinary meaning, refers to a mechanism for capturing chronological and/or causal relationships in a distributed system. Distributed systems may not have a synchronous global clock. Accordingly, a logical clock can allow ordering of events from different processes. A "logical clock value" can be a data value, such as a numerical value, that allows an order to be determined between first and second data values. An example logical clock can be a vector clock.

The cache entry 302 can include a logical clock value. The logical clock value can indicate a logical time when the entry was added to the cache. There can be one or more shared logical clocks for cache entries. A logical clock can be an n-bit counter, such as a 64-bit counter, which can reset to zero and wrap around (in which case all cache entries using the logical clock may have to be invalidated). The maximum integer for a 64-bit is a very large number, e.g., $2^{63}-1$. When an entry is written to the cache, such as the cache entry 302, a logical clock is incremented and the incremented value is written to the metadata portion 306 of the cache entry 302. When an invalidation entry related to cache entry 302 is written, the logical clock is further incremented and the further incremented value is stored in association with the invalidation entry. Thus, the retrieval service 108 can determine a chronological order of the cache entry 302 relative to an associated invalidation entry based on their relative logical clock values. If the invalidation entry is relatively newer than an associated cache entry (e.g., if the invalidation entry has a higher logical clock value than the logical clock value for the cache entry), then the cache entry may be invalid. Conversely, the cache entry can be relatively newer than an associated invalidation entry (e.g., if the logical clock value for the cache entry is higher than the logical clock value for the invalidation entry), then the retrieval service 108 may ignore the invalidation entry and the cache entry may be considered fresh enough.

The metadata portion 306 can include an approximate entry time (here "2019-06-03 13:12:11.4313"), which can be a timestamp. The entry time can be an approximate time of when the entry was written to the cache. In particular, the approximate entry time can be based on a hardware clock of the cache server hosting the cache. In other embodiments, clocks other than the hardware clock of the cache server can be used. In some embodiments, approximate entry times may not be reliable from a distributed computing system's perspective of determining validity; however, the approximate entry times can be useful to understand approximate real-world times of when entries were written. When a client requests a cache entry, metadata related to the entry, such as the approximate entry time, can be returned to the client.

In an electronic commerce tax context, the cache entry 302 can be for a data type that converts an offer listing (a specific item sold by a merchant) to some tax information. While not illustrated, the key-value can be an offer listing identifier for the cache entry 302; the entry data for the cache entry 302 can be the tax information or an identifier for the tax information. While not illustrated, the logical dependency portion 308 of the cache entry 302 can indicate that the cache entry 302 is dependent on three tax-related data items, such as an offer listing identifier of an offer listing data type, a marketplace or merchant identifier of a marketplace or merchant data type, and a product identifier of a product data type.

Figure 4:
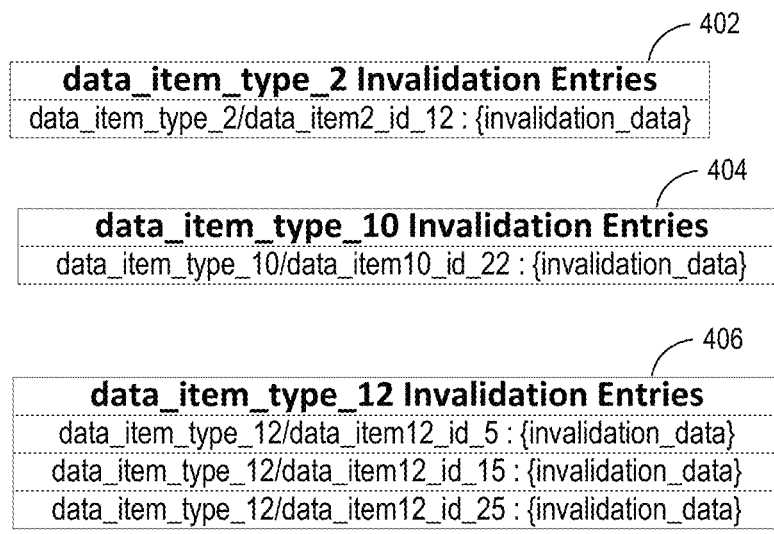
FIG. 4 is a schematic block diagram depicting example invalidation entries.

FIG. 4 is a schematic block diagram depicting example invalidation entry tables 402, 404, 406. The invalidation entry tables 402, 404, 406 can be stored in the metadata store 114, which can include one or more caches or can be a cache, such as an in-memory key-value database. The invalidation entry tables 402, 404, 406 can correspond to the dependencies of the cache entry 302. For example, the first invalidation entry table 402 can be for a first entry data type (here "data_item_type_2"), the second invalidation entry table 404 can be for a second entry data type (here "data_item_type_10"), and the third invalidation entry table 406 can be for a third entry data type (here "data_item_type_123"). Each of the invalidation entries in the invalidation entry tables 402, 404, 406 can include invalidation data, such as a logical clock value that corresponds to a logical time of when the invalidation entry was written to the metadata store 114.

If the cache entry 302 in FIG. 3 was requested, the request would cause reads of each table in FIG. 4. Since no corresponding invalidation entries are found in the invalidation entry tables 402, 404, 406 that correspond to the cache entry's 302 dependencies 308, the cache entry 302 is returned. However, if an invalidation record is found and current (e.g., based on a logical clock), the cache entry can be deleted from the cache(s) 112 and/or the distributed cache system 104 can report a cache miss. In some embodiments, the invalidation entry key-values can include a key-prefix such as the data type of the invalidation entry.

Key-prefixes can enable namespacing for values, such as the key-prefixes for the invalidation entries in FIG. 4 or the key-prefix for the cache entry 302 in FIG. 3. The actual key can be that key-prefix plus the key-value field together. By using key-prefixes, multiple versions of entries can be run at once in the same cache or potentially in separate ones. Logically related sets of data can be stored together in the same cache.

In some embodiments, the invalidation data can include approximate entry time(s) and/or other data. Example approximate entry times and/or other data can include the first time an invalidation record was written, how many times an invalidation entry was written, and a most recent time an invalidation record was written. For example, one or more data providers and/or updaters 118 can write the same invalidation entry multiple times before a corresponding cache eviction and multiple entry times related to the first time the invalidation record was written, how many times the invalidation entry was written, and a most recent time the invalidation record was written can be stored in the invalidation data. The approximate entry time(s) in the invalidation data can be similar to the approximate entry time in the metadata portion 306. Accordingly, the approximate entry time(s) in the invalidation data can be a timestamp. The entry time(s) in the invalidation data can be an approximate time of when the entry was written to the cache. The approximate entry time(s) can be based on a hardware clock of the cache server hosting the cache or another clock. As described herein, the approximate entry times(s) of an invalidation entry can be used for freshness purposes, which is described in further detail below with respect to FIG. 6.

Figure 5:
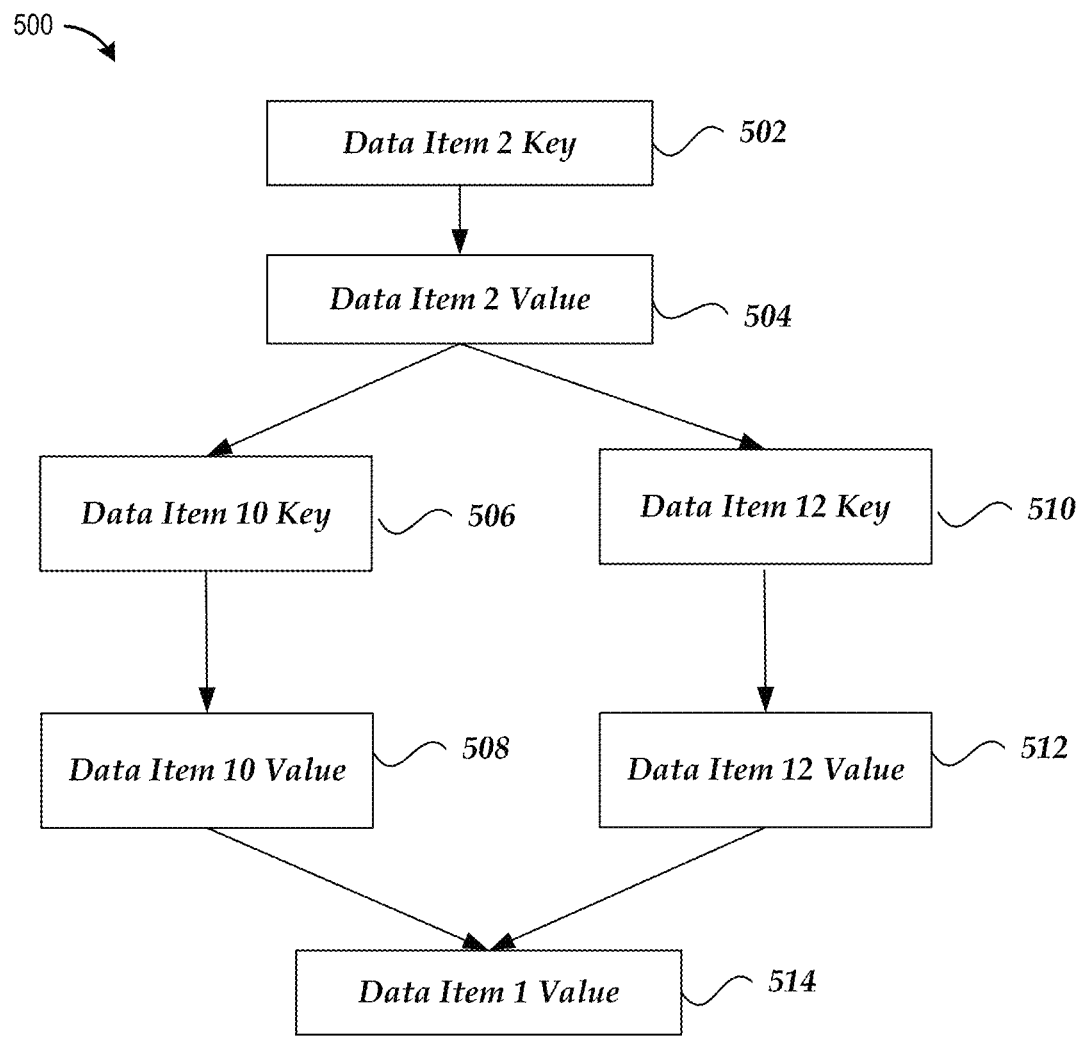
FIG. 5 is a schematic block diagram depicting example data dependencies.

FIG. 5 is a schematic block diagram depicting example data dependencies. The data environment 500 can include data item keys and/or values 502, 504, 506, 508, 510, 512, 514. The data dependencies depicted in FIG. 5 can correspond to the data dependencies of the cache entry 302 of FIG. 3. The data dependencies of FIG. 5 can be transitive or directional relationships. In the data environment 500, the entry key is the "Data Item 2" key 502 (such as an offer listing key) and the entry value is the "Data Item 1" value (such as some tax information), which can correspond to the cache entry 302 of FIG. 3. The mapping from the "Data Item 2" key 502 (such as an offer listing key) can be dependent on the "Data Item 12" value 512 (such as product attributes) of the "Data Item 12" (such as the product/offer), and the "Data Item 10" value 508 (such as the product classification rules) of the "Data Item 10" (such as the merchant or marketplace). The cache entry 302 of FIG. 3 can be dependent on the "Data Item 2" key 502, the "Data Item 10" key 506, and the "Data Item 12" key 510. If any of the values related to the identifiers 502, 506, 510 change, then the cache entry can be identified as invalid. By tracking data dependencies, the distributed cache system 104 can make it practical to cache such dependencies and to keep entries in the cache for relatively long periods of time.

Figure 6:
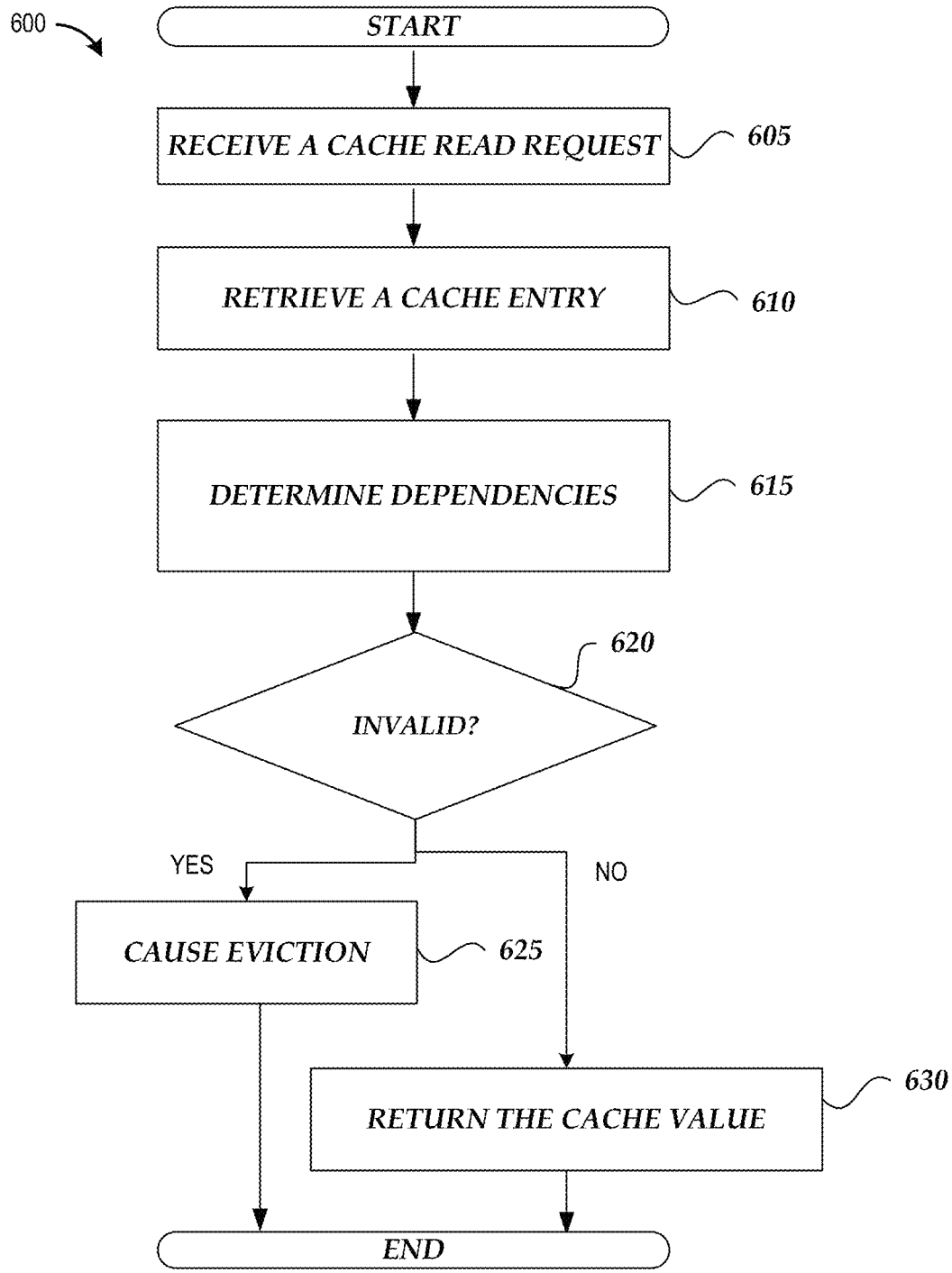
FIG. 6 is a flow diagram depicting an example method for managing cache read requests and/or invalidations.

FIG. 6 is a flow diagram depicting an example method 600 implemented by the retrieval application 216 and/or the retrieval service 108 for managing cache read requests and/or invalidations. As discussed above, in some embodiments, the retrieval service 108 may include the retrieval application 216, and may implement the method 600. In other embodiments, the retrieval application 216 may be implemented by the one or more data consumers 102. In yet other embodiments, functions of the validity application 216 may be distributed between various services or devices of the distributed cache system 104.

The example method 600 begins at block 605, where a cache read request can be received. In particular, the retrieval application 216 can receive a cache read request from the one or more data consumers 102. The one or more data consumers 102 can be a computing device external to the distributed cache system 104. The cache read request can include a key-value, such as an identifier value, that can correspond to a data_item. With respect to the example cache entry 302 of FIG. 3, a data consumer 102 that requests the entry data for the cache entry can submit a request with a key-value identifier such as "data_item2_id 4."

In some embodiments, the cache read request can include a freshness level. A data consumer 102 can specify an acceptable freshness level that the consumer 102 is willing to accept from the distributed cache. Example freshness levels can correspond to a high freshness level (such as "fresh"), a medium freshness level (such as "acceptable"), or a lower freshness level (such as "stale" or "low reliability"). Depending on the use case of the data consumer 102, various levels of freshness may be acceptable. For example, a data consumer that is requesting results for a search user interface a lower degree of freshness may be acceptable because availability may take priority over correctness. Conversely, if a customer is going through a checkout process, the data consumer for the checkout process may want a higher degree of freshness because correctness may take priority over availability.

At block 610, a cache entry can be retrieved. In particular, the retrieval application 216 can retrieve, from a data store, a cache entry corresponding to the cache read request. As described herein, the data store can be a distributed cache, a cluster, an in-memory database, and/or a key-value database, such as the one or more caches 112. For example, the retrieval application 216 can query the key-value database for the cache entry as output corresponding to the key input value (such as "data_item2_id 4" in the example cache entry 302 of FIG. 3).

At block 615, data dependencies can be determined. In particular, the retrieval application 216 can determine that the cache entry is associated with one or more data dependencies. The set of data dependencies can depend on the type of the data item. As described above with respect to FIG. 3, a cache entry 302 can include a logical dependency portion 308, such as a list, which indicates that the particular cache entry 302 is dependent on zero or more other data items. The retrieval application 216 can determine that a particular cache entry is associated with a data dependency on one or more other data items. The data dependencies can represent a data relationship, such as the transitive or directional data relationship between data items. Such relationships are described above in further detail with respect to FIG. 5.

At block 620, an invalidity and/or freshness of the cache entry can be determined. In particular, the retrieval application 216 can determine that the cache entry is invalid and/or a level a freshness associated with the cache entry. The retrieval application 216 can check a data store, such as the metadata store 114, for an invalidation entry corresponding to the data dependency. Similar to the one or more caches 112, the metadata store 114 can be a distributed cache, a cluster, an in-memory database, and/or a key-value database. The retrieval application 216 can query the metadata store 114 with a data value for a data dependency as a key input. The invalidation entry tables 402, 404, 406 described above in further detail with respect to FIG. 4 can be in the metadata store 114. The retrieval application 216 can receive, from the metadata store 114, an invalidation entry as a value output for the key input, if such an invalidation entry exists. Since the metadata store 114 can be a key-value database, checking the metadata store 114 for the presence of a corresponding invalidation entry can be a fast retrieval computational process.

The retrieval application 216 can determine whether the cache entry and the one or more invalidation entries satisfy a validity condition. For example, the retrieval application 216 can determine that an invalidation entry is more recent than the cache entry, which indicates that the cache entry may be invalid. The retrieval application 216 can access a logical clock value for each of the invalidation entry and the cache entry. The logical clock values can be stored or included within the respective cache entry or invalidation entry. The respective logical clock values can indicate a respective order of when each of the cache entry or the invalidation entry was written to the distributed system. As described herein, the logical clock values can be numerical values such as integers. Thus, the retrieval application 216 can determine that an invalidation entry was likely, chronologically written after the cache entry based on a first logical clock value, such as a first numerical value of 100, for an invalidation entry relative to a second logical clock value, such as a first numerical value of 10, for a cache entry where the first numerical value is greater than the second numerical value. The converse can also be true, if the first logical clock value or numerical value for the invalidation entry is less than or lower than the second logical clock value or numerical value for the cache entry, then the retrieval application 216 can determine that an invalidation entry was likely, chronologically written before the cache entry. In other words, the logical clock values can indicate whether particular entries are newer or older relative to other entries. Generally, if the invalidation entry is newer than the cache entry, the cache entry is invalid or likely invalid. Conversely, if there isn't an invalidation entry or the invalidation entry is older than the cache entry, the cache entry is valid or likely valid.

Due to concurrency issues in a distributed system, the logical clock values may indicate an approximate level of ordering or freshness. The retrieval application 216 can take into account a requested level of freshness by a data consumer 102 in applying a validity condition. As described above at block 302, the cache read request can include a freshness level, such as a high freshness level (such as "fresh"), a medium freshness level (such as "acceptable"), or a lower freshness level (such as "stale" or "low reliability") based on the requesting client's preferences. Each of the freshness levels can correspond to threshold values that indicate a client's preference for freshness and/or staleness of data. The retrieval application 216 can determine that a value difference between a first logical clock value and a second logical clock value satisfies a threshold value that corresponds to the specified freshness level (such as by being within a threshold value). For example, a client may want relatively "fresh" data that corresponds to only invalidation entries and cache entries being within 10 integer counts of one another; anything greater than the 10 integer count threshold value may be deemed to stale to be returned. The retrieval application 216 can apply additional or alternative validity condition(s) that take into account a quantity of invalidation entries associated with a cache entry. For example, a client may want relatively "fresh" level that corresponds to cache entries that do not have an invalidation entry associated with the cache entry. As another example, a different client may accept a less "fresh" level that accommodates a threshold quantity of invalidation entries, such as one, two, three, or more invalidation entries per cache entry depending on the embodiment and corresponding freshness level.

If it is determined that a cache entry is invalid or is likely invalid, such as determining that an invalidation entry is more recent than the cache entry or even the existence of an invalidation entry associated with the cache entry, the method 600 can proceed to block 625. At block 625, an eviction can be caused. In particular, the retrieval application 216 can evict the cache entry from the data store, such as the one or more caches 112. The retrieval application 216 can provide a notification to the data consumer 102 of a cache miss for the cache read request. In some embodiments, the retrieval application 216 can request an updated cache value corresponding to the cache read request and can provide the updated cache value to the data consumer 102. As described herein, requesting an updated cache value can include making a service call and storing the result of the service call in the one or more caches 112.

If it is determined that a cache entry is valid, likely valid, or within a threshold level of freshness, the method 600 can proceed to block 630. At block 630, the cache value and/or the cache entry can be returned. An example cache value or an identifier for a cache value is the entry data of the cache entry 302 described above with respect to FIG. 3. The retrieval application 216 can return a cache result to the data consumer 102, which can include at least the cache value of the cache entry. Accordingly, the retrieval application 216 and/or the distributed cache system 104 can quickly return the cache value, which can be dependent on cached data dependencies and/or multiple service calls, without having to purge the distributed cache indiscriminately.

In some embodiments, the cache result can include a freshness indicator. As described herein, the freshness indicator can be determined by the retrieval application 216. The retrieval application 216 can determine a value difference between the first logical clock value and the second logical clock value. The retrieval application 216 can determine a potential freshness level of the cache entry based at least in part on the value difference. For example, a relatively small value difference may indicate likely fresh, a medium value difference may indicate medium likelihood of freshness, and a large value difference may indicate a low likelihood of freshness, each of which can be defined by various threshold values. As described herein, a freshness indicator can also correspond to a quantity of invalidation entries associated with a cache entry. For example, no invalidation entries can indicate that a cache entry is likely fresh, the existence of some invalidation entries can indicate a lower level of freshness, and a high quantity of associated invalidation entries can indicate a very low level of freshness. The retrieval application 216 can assign the freshness indicator to the cache result where the freshness indicator can indicate the potential freshness level of the cache entry.

In some embodiments, the freshness levels and/or thresholds can also be used to issue one or more alarms. For example, if a cache entry is determined to be quite old relative to an invalidation entry, the retrieval application 216 can issue an alarm to notify other services or administrators to investigate the staleness issues. The alarms can be issued in the case of returned cache results and/or in the case of cache evictions.

In some embodiments, freshness can be determined based on approximate entry time(s). For example, the approximate entry time of an invalidation entry regarding the first time an invalidation entry was written can be used by the retrieval application 216. The retrieval application 216 can determine that an approximate entry time, such as the first time the invalidation entry was written, exceeds a time difference threshold, and can return a freshness indicator corresponding to the determination. The retrieval application 216 can also determine validity conditions based on the entry time(s), such as the first time the invalidation entry was written exceeding a time difference threshold can indicate that the corresponding cache entry should be considered invalid. Additionally or alternatively, the retrieval application 216 can return metadata associated with a cache entry, including indications that a cache entry has one or more data dependencies with an invalidation entry and/or the metadata associated with the invalidation entries, which can include the approximate entry time(s). Thus, a client can determine what to do with the cache entry based on the returned metadata.

In some embodiments, cache eviction can occur asynchronously. A service, such as the maintenance service 116, can asynchronously evict entries from the one or more caches 112. As described herein, the retrieval application 216 can return a cache value that might be stale with a freshness indicator. Accordingly, in cases where stale or likely stale values are returned, similar to the check that can occur at block 620, the maintenance service 116 can periodically check invalidation entries in the metadata store 114 and evict cache entries that are likely stale. An advantage of embodiments with asynchronous cache eviction is the improvement of cache availability. For example, if the data provider for an updated value is down or slow, then asynchronous cache eviction can avoid a situation where the retrieval application 216 or the data consumer 102 has to wait for the data provider. At block 620, the retrieval application 216 can determine that a validity condition, such as where an invalidation entry satisfies a threshold staleness, as described herein, a slightly stale cache result can be returned and asynchronous cache eviction can clean up the stale entry.

Figure 7:
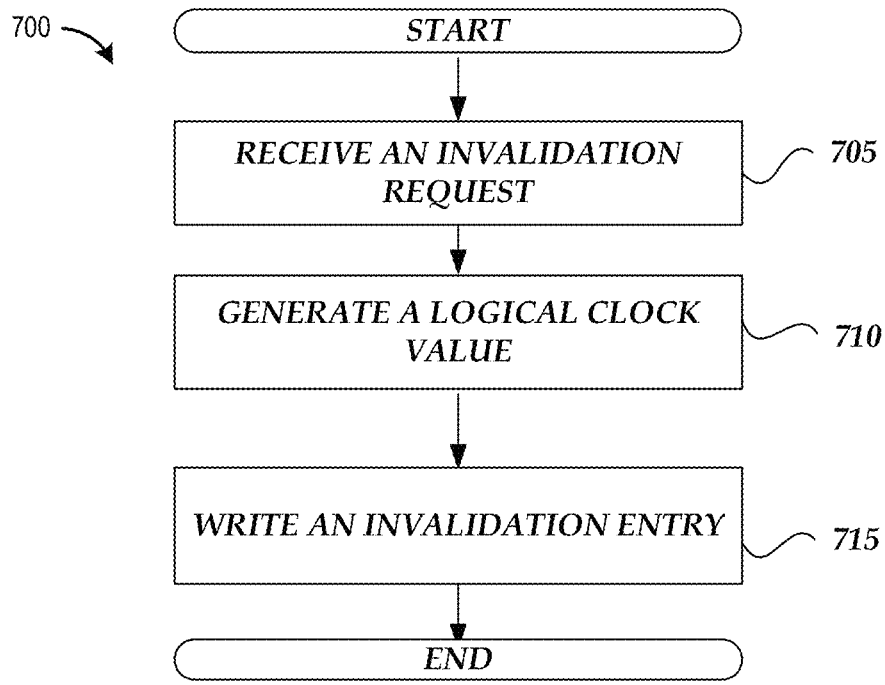
FIG. 7 is a flow diagram depicting an example method for managing invalidation requests.

FIG. 7 is a flow diagram depicting an example method 700 implemented by the invalidation application 222 and/or the invalidation service 110 for managing invalidation requests. As discussed above, in some embodiments, the invalidation service 110 may include the invalidation application 222, and may implement the method 700. In other embodiments, functions of the invalidation application 222 may be distributed between various services or devices of the distributed cache system 104.

The example method 700 begins at block 705, where an invalidation request can be received. In particular, the invalidation application 222 can receive the invalidation request from the one or more data providers and/or updaters 118, such as other computing devices in a distributed network environment. The invalidation request can indicate that a particular cached data item or value should be invalidated.

At block 710, a logical clock value can be generated. In particular, the invalidation application 222 can request or generate a logical clock value. A logical clock value can be a data value, such as a numerical or integer value, which is discussed above in greater detail with respect to FIGS. 3 and 4. The invalidation application 222 can generate the logical clock value by incrementing a current logical clock value. For example, if a current logical clock value is 100, the next logical clock value would be 101, 102, 103, and so forth. Thus, an incremented logical clock value can indicate a subsequent chronological order relative to previous logical clock values.

At block 715, the invalidation entry can be written to a data store. In particular, the invalidation application 222 can write the invalidation entry to the metadata store 114. The written invalidation entry can include the generated logical clock value, which can indicate a relative chronological order of when the invalidation entry was written to the distributed system relative to other logical clock values and other data items in the distributed system. Since the metadata store 114 can be a key-value database, writing to the metadata store 114 can include writing a key-value and invalidation data (such as the logical clock value) to the metadata store 114. The invalidation application 222 can write the invalidation entry in an invalidation entry table in a data store, such as the tables 402, 404, 406 described above in further detail with respect to FIG. 4. The written invalidation entries can be read by the retrieval method 600, which is described above in further detail with respect to block 620 of FIG. 6.

Figure 8:
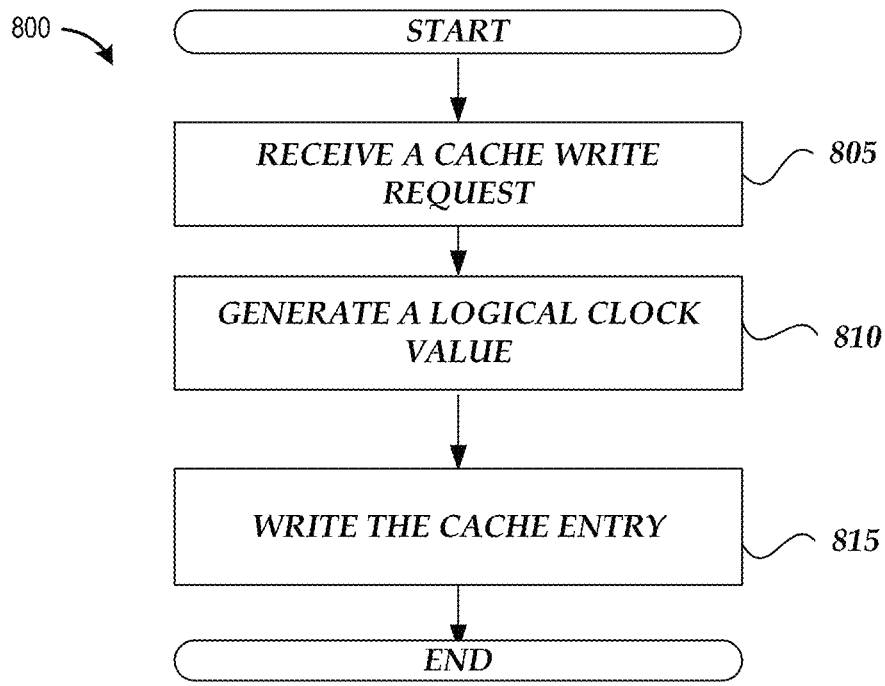
FIG. 8 is a flow diagram depicting an example method for managing cache write requests.

FIG. 8 is a flow diagram depicting an example method 800 implemented by the distributed cache system 104 and/or the one or more data providers and/or updaters 118 for managing cache write requests.

The example method 800 begins at block 805, where a cache write request can be received. In particular, the distributed cache system 104 can receive the cache write request from the one or more data providers and/or updaters 118, such as other computing devices in a distributed network environment. The cache write request can indicate that a particular cached data item or value should be written or updated.

At block 810, a logical clock value can be generated. This block 810 can be similar to the block 710 of FIG. 7 described above for generating a logical clock value in the invalidation entry writing context. In particular, the distributed cache system 104 can request or generate a logical clock value. The distributed cache system 104 can generate the logical clock value by incrementing a current logical clock value. The same logical clock can be used between the services or devices writing invalidation entries and/or cache entries, such that the relative chronological order of when invalidation entries and cache entries were written can be compared.

At block 815, the cache entry can be written to a data store. In particular, the distributed cache system 104 can write the invalidation entry to the one or more caches 112. The written cache entry can include the generated logical clock value, which can indicate a relative chronological order of when the cache entry was written to the distributed system relative to other logical clock values and other data items in the distributed system. The written cache entry can also include a key-value, the entry data, data dependencies, and/or other metadata, which can be described in further detail above with respect to FIG. 3.

In some embodiments, the distributed cache system 104 and/or the one or more caches 112 can implement a least frequently used (LFU) eviction policy. The least frequently used (LFU) eviction policy can cause cache entries to be evicted in a cache 112 becomes too full. In some embodiments, a least frequently used replacement policy may be advantageous in contrast to least recently used (LRU) eviction policies, where newly added but infrequently used values can cause older but frequently used values to be evicted from the cache, which can be known as a cache stampede if there is a large amount of cache updates. In some embodiments, the least frequently used eviction policy can be implemented in a cache with adaptive decay such that a particular data item does not remain cached indefinitely but rather can decay over time. In some embodiments, each cache may run in a non-sharded or mono-sharded mode and a multi-sharded mode to take advantage of the performance benefits of each sharded type depending on the situation.

Figure 9:
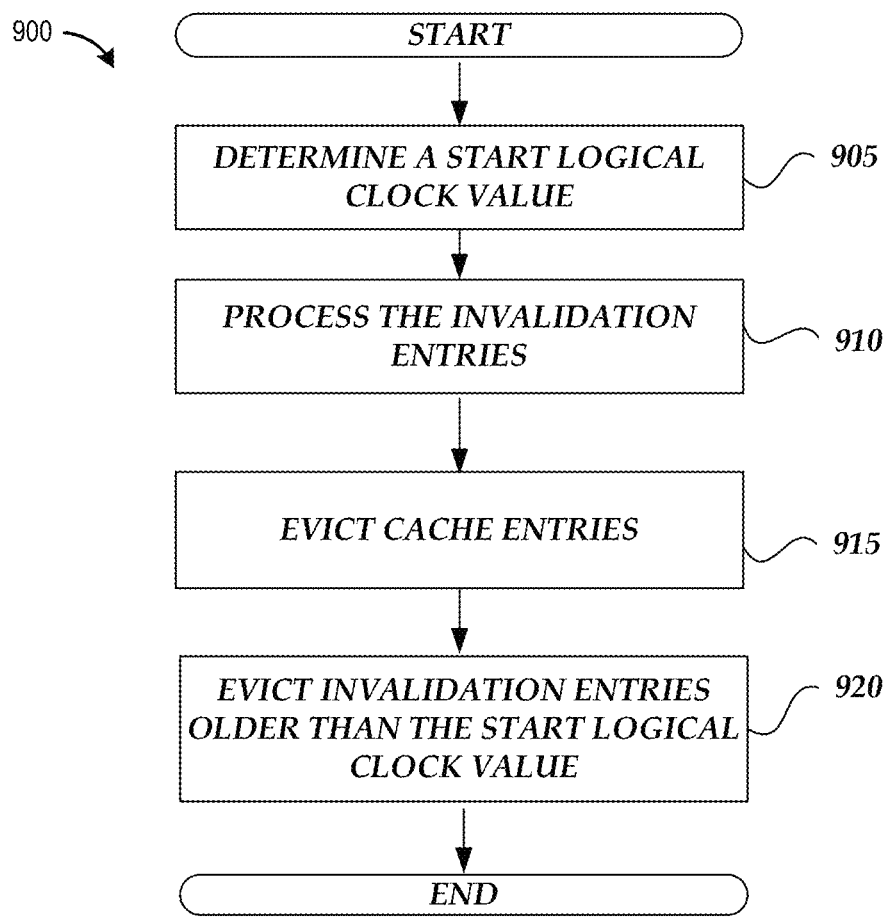
FIG. 9 is a flow diagram depicting an example method for managing invalidation and/or cache entries.

FIG. 9 is a flow diagram depicting an example method 900 implemented by the maintenance application 224 and/or the maintenance service 116 for managing invalidation and/or cache entries. As discussed above, in some embodiments, the maintenance service 116 may include the maintenance application 224, and may implement the method 900. In other embodiments, functions of the maintenance service 116 may be distributed between various services or devices of the distributed cache system 104.

Generally the method 900 can be a maintenance sweeper that cleans up outdated invalidation entries, which can also be referred to as garbage collection. Without the method 900, invalidation entries in the metadata store 114 would grow indefinitely. Unlike the one or more caches 112, a generic eviction policy cannot be applied in some embodiments since that would corrupt the invalidation features and framework described herein. The maintenance application 224 can determine that an invalidation entry is outdated, such as where a new cache entry associated with the invalidation entry has been written to the one or more caches. The maintenance application 224 can then evict the invalidation entry from the metadata store 114. The maintenance application 224 and/or the maintenance service 116 can perform sweeps of the invalidation entries asynchronously.

The example method 900 begins at block 905, where a start logical clock value can be determined. In particular, the maintenance application 224 can determine a start logical clock value before a current sweep of the invalidation entries begins. The maintenance application 224 can read a current logical clock value and assign the current logical clock value to the start logical clock value. In other embodiments, the maintenance application 224 can increment the current logical clock value to determine the start logical clock value.

At block 910, the invalidation entries can be processed. In particular, the maintenance application 224 can process the invalidation entries. The maintenance application 224 can process each of the invalidation entries in the metadata store 114. Processing the invalidation entries can include identifying corresponding cache entries for each invalidation entry. For example, a first cache entry that has an identifier that corresponds to the invalidation entry identifier can be evicted and/or any cache entries that depend on the first cache entry, as described herein, can be evicted. The maintenance application 224 can determine that a cache entry is older than an invalidation entry, e.g., the maintenance application 224 can determine that the cache entry includes a logical clock value older than a logical clock value associated with the invalidation entry. At block 915, the cache entries can be evicted. For example, since the cache entry was determined to be old or likely old, the maintenance application 224 can evict the cache entry from the one or more caches 112.

In some embodiments, the maintenance application 224 can process a subset of invalidation entries as opposed to all of the invalidation entries in the metadata store 114. An example subset of invalidation entries can be an earliest invalidation entry or the 500 earliest invalidation entries. The maintenance application 224 can process a subset of invalidation entries because the subset of entries can be ordered by logical clock values and so long as the invalidation entries are processed in order the causality relationship between cache entries and invalidation entries can be maintained. In embodiments where a single maintenance application 224 processes a subset of invalidation entries, a start logical clock value may not be needed, and the maintenance application 224 can evict the subset of invalidation entries after each of invalidation entries have been processed.

At block 920, each invalidation entry older than the start logical clock value can be evicted. For example, upon finishing processing the invalidation entries and evicting corresponding old cache entries from the caches 112, the maintenance application 224 can evict one or more invalidation entries that are older than the start logical clock value, which is when the sweep began. The maintenance application 224 can again compare logical clock values of the invalidation entries to the start logical clock value, and if the logical clock values of the invalidation entries are older than the start logical clock value, then the maintenance application 224 can evict the corresponding one or more invalidation entries. In other words, the maintenance application 224 can evict invalidation entries once it has been determined that there are not cache entries that are currently associated with the older invalidation entries. In some embodiments, one or more maintenance services 116, each with its own maintenance application 224, can execute the method 900 for maintenance sweeping. For example, multiple maintenance services 116 can be executed where each maintenance service 116 processes invalidation entries earlier than a start logical clock value.

In some embodiments, the maintenance application 224 can have resiliency mechanisms. For example, at block 910, when a particular invalidation entry has been processed by the maintenance application 224, the maintenance application 224 can write a progress status to a database, such as a last invalidation entry processed record. Thus, if the maintenance application 224 crashes during a maintenance sweep, the maintenance application 224 can restart and begin the sweep at the invalidation entry following the last invalidation entry processed. Thus, the maintenance application 224 can recover from a failure.

While a network form is often used as an example herein, it will be appreciated that methods for efficiently managing resources and/or caches, as disclosed herein, may be used in a variety of environments other than for network forms. While some examples described herein discuss an electronic commerce context and/or tax information context, these systems and techniques described herein for improved caching techniques may be applicable to any other distributed context.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Further, the term "each", as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for managing a distributed cache, the computer-implemented method comprising:

under control of a computer hardware processor configured with specific computer executable instructions, receiving a cache read request from an external computing device, wherein the cache read request comprises a freshness level;

retrieving, from a first data store, a cache entry corresponding to the cache read request;

determining that the cache entry is associated with a first data dependency and a second data dependency;

checking a second data store for an invalidation entry corresponding to at least one of the first data dependency or the second data dependency, wherein checking the second data store further comprises:

identifying a first invalidation entry for the at least one of the first data dependency or the second data dependency;

determining that the first invalidation entry and the cache entry fail a validity condition, wherein determining that the first invalidation entry and the cache entry fail the validity condition further comprises:

accessing a first logical clock value for the first invalidation entry;

accessing a second logical clock value for the cache entry, wherein the first logical clock value and the second logical clock value indicate a chronological relationship in a distributed environment; and determining, in the distributed environment, that a value difference between the first logical clock value and the second logical clock value is greater than or less than a threshold value that corresponds to the freshness level;

evicting, from the first data store, the cache entry;

requesting an updated cache value corresponding to the cache read request; and providing the updated cache value to the external computing device.

2. The computer-implemented method of claim 1, wherein the first logical clock value comprises a first numerical value, and wherein the second logical clock value comprises a second numerical value.

3. The computer-implemented method of claim 1, further comprising:

receiving an invalidation request for a data item from another external computing device;

generating a third logical clock value, wherein generating the third logical clock value comprises:

incrementing a current logical clock value; and writing, to the second data store, a second invalidation entry for the data item, the second invalidation entry comprising the third logical clock value that indicates a subsequent chronological order relative to the first logical clock value and the second logical clock value.

4. The computer-implemented method of claim 1, wherein the second data store comprises a key-value database, and wherein checking the second data store for the invalidation entry further comprises:

querying the second data store with a first data value for the first data dependency as a key input; and receiving, from the second data store, the first invalidation entry as a value output for the key input.

5. The computer-implemented method of claim 1, further comprising:

evicting a second cache entry from the first data store according to a least frequently used eviction policy.

6. A system comprising:

a first data store;

a second data store; and a hardware processor in communication with the first data store and the second data store, the hardware processor configured to execute computer-executable instructions to at least:

receive a cache read request for a first data item from an external computing device, wherein the cache read request comprises a freshness level;

retrieve, from the first data store, a cache entry for the first data item;

determine that the cache entry is associated with a data dependency on a second data item;

check the second data store for an invalidation entry corresponding to the data dependency, wherein to check the second data store for an invalidation entry corresponding to the data dependency, the hardware processor is further configured to execute the computer-executable instructions to at least:

identify a first invalidation entry for the data dependency on the second data item;

determine that the first invalidation entry and the cache entry fail a validity condition, wherein to determine that the first invalidation entry and the cache entry fail the validity condition, the hardware processor is further configured to execute the computer-executable instructions to at least:

access a first logical clock value for the first invalidation entry;

access a second logical clock value for the cache entry, wherein the first logical clock value and the second logical clock value indicate a chronological relationship in a distributed environment; and determine, in the distributed environment, that a value difference between the first logical clock value and the second logical clock value is greater than or less than a threshold value that corresponds to the freshness level;

evict, from the first data store, the cache entry; and provide a notification to the external computing device of a cache miss for the cache read request.

7. The system of claim 6, wherein the hardware processor is further configured to execute the computer-executable instructions to at least:

receive a cache write request for the second data item from another external computing device;

generate a third logical clock value, wherein to generate the third logical clock value, the hardware processor is further configured to execute the computer-executable instructions to at least:

increment a current logical clock value; and write, to the first data store, a new cache entry for the second data item, the new cache entry comprising the third logical clock value that indicates a subsequent chronological order relative to the first logical clock value.

8. The system of claim 6, wherein the hardware processor is further configured to execute the computer-executable instructions to at least:

receive a cache write request for the second data item from another external computing device;

write, to the first data store, a new cache entry for the second data item;
determine that the first invalidation entry is outdated; and
evict the first invalidation entry from the second data store.

9. The system of claim 6, wherein the hardware processor is further configured to execute the computer-executable instructions to at least:
process each invalidation entry of a plurality of invalidation entries from the second data store, wherein to process each invalidation entry, the hardware processor is further configured to execute the computer-executable instructions to at least:
identify a second cache entry for a second invalidation entry;
determine that the second cache entry comprises a fourth logical clock value older than a third logical clock value associated with the second invalidation entry; and
evict the second cache entry from the first data store.

10. The system of claim 9, wherein the hardware processor is further configured to execute the computer-executable instructions to at least:
determine a start logical clock value before a sweep begins to process the plurality of invalidation entries;
determine that the third logical clock value for the second invalidation entry is older than the start logical clock value; and
evict the second invalidation entry from the second data store.

11. The system of claim 10, wherein the third logical clock value comprises a first numerical value, wherein the start logical clock value comprises a second numerical value, and wherein to determine that the third logical clock value is older than the start logical clock value, the hardware processor is further configured to execute the computer-executable instructions to at least:
determine that the first numerical value is less than the second numerical value.

12. The system of claim 10, wherein to determine the start logical clock value, the hardware processor is further configured to execute the computer-executable instructions to at least:
generate the start logical clock value, wherein to generate the start logical clock value, the hardware processor is further configured to:
increment a current logical clock value.

13. A system comprising:
a first data store;
a second data store; and
a hardware processor in communication with the first data store and the second data store, the hardware processor configured to execute computer-executable instructions to at least:
receive a cache read request from an external computing device, wherein the cache read request comprises a freshness level;
retrieve, from the first data store, a cache entry corresponding to the cache read request;
determine that the cache entry is associated with a data dependency;
check the second data store for an invalidation entry corresponding to the data dependency, wherein to check the second data store, the hardware processor is further configured to execute the computer-executable instructions to at least:
identify a first invalidation entry for the data dependency;
determine that the first invalidation entry and the cache entry fail a validity condition, wherein to determine that the first invalidation entry and the cache entry fail the validity condition, the hardware processor is further configured to execute the computer-executable instructions to at least:
access a first logical clock value for the first invalidation entry;
access a second logical clock value for the cache entry, wherein the first logical clock value and the second logical clock value indicate a chronological relationship in a distributed environment; and
determine, in the distributed environment, that a value difference between the first logical clock value and the second logical clock value is greater than or less than a threshold value that corresponds to the freshness level; and
evict, from the first data store, the cache entry.

14. The system of claim 13, wherein the hardware processor is further configured to execute the computer-executable instructions to at least:
receive a second cache read request from a second external computing device;
retrieve, from the first data store, a second cache entry corresponding to the second cache read request;
determine that the second cache entry is associated with a second data dependency;
identify, from the second data store, a second invalidation entry for the second data dependency;
determine that at least the second cache entry and the second invalidation entry satisfy a second validity condition, wherein to determine that at least the second cache entry and the second invalidation entry satisfy the second validity condition, the hardware processor is further configured to execute the computer-executable instructions to at least:
access a third logical clock value for the second invalidation entry;
access a fourth logical clock value for the second cache entry; and
determine that the second cache entry is newer than the second invalidation entry based at least in part on the fourth logical clock value and the third logical clock value; and
provide a cache result comprising at least a cache value from the second cache entry to the second external computing device.

15. The system of claim 13, wherein the hardware processor is further configured to execute the computer-executable instructions to at least:
receive a second cache read request from a second external computing device;
retrieve, from the first data store, a second cache entry corresponding to the second cache read request;
determine that the second cache entry is associated with a second data dependency;
identify, from the second data store, a second invalidation entry for the second data dependency;
determine that at least the second cache entry and the second invalidation entry satisfy a second validity condition;
access a third logical clock value for the second invalidation entry;
access a fourth logical clock value for the second cache entry;

determine a second value difference between the third logical clock value and the fourth logical clock value;

determine a second freshness level of the second cache entry based at least in part on the second value difference;

assign a freshness indicator to a cache result, the freshness indicator indicating the second freshness level of the cache entry; and provide the cache result comprising at least (i) a cache value from the second cache entry, and (ii) the freshness indicator to the second external computing device.

16. The system of claim 15, wherein to determine the second freshness level of the second cache entry, the hardware processor is further configured to execute the computer-executable instructions to at least:

determine that the second value difference satisfies a second threshold value that corresponds to the second freshness level.

17. The system of claim 13, wherein the hardware processor is further configured to execute the computer-executable instructions to at least:

receive a second cache read request from a second external computing device, wherein the second cache read request further comprises a second freshness level;

retrieve, from the first data store, a second cache entry corresponding to the second cache read request;

determine that the second cache entry is associated with a second data dependency;

identify, from the second data store, a second invalidation entry for the second data dependency;

determine that at least the second cache entry and the second invalidation entry satisfy a second validity condition, wherein to determine that at least the second cache entry and the second invalidation entry satisfy the second validity condition, the hardware processor is further configured to execute the computer-executable instructions to at least:

access a third logical clock value for the second invalidation entry;

access a fourth logical clock value for the second cache entry; and determine that a second value difference between the third logical clock value and the fourth logical clock value satisfies a threshold value that corresponds to the second freshness level; and provide a cache result comprising at least a cache value from the second cache entry to the second external computing device.

18. The system of claim 13, wherein the hardware processor is further configured to execute the computer-executable instructions to at least:

receive a second cache read request from a second external computing device;

retrieve, from the first data store, a second cache entry corresponding to the second cache read request;

determine that the second cache entry is associated with a second data dependency;

identify, from the second data store, a second invalidation entry for the second data dependency;

determine that the second cache entry is further associated with a plurality of invalidation entries;

determine that at least the second cache entry and the second invalidation entry satisfy a second validity condition;

determine a second freshness level of the second cache entry based at least in part on the existence of the plurality of invalidation entries;

assign a freshness indicator to the second cache entry, the freshness indicator indicating the second freshness level of the second cache entry; and provide a cache result comprising at least (i) a cache value from the second cache entry, and (ii) the freshness indicator to the second external computing device.

19. The system of claim 13, wherein the hardware processor is further configured to execute the computer-executable instructions to at least:

receive a second cache read request from a second external computing device;

retrieve, from the first data store, a second cache entry corresponding to the second cache read request;

determine that the second cache entry is associated with a second data dependency;

identify, from the second data store, a second invalidation entry for the second data dependency;

determine that the second cache entry is further associated with a plurality of invalidation entries;

determine that at least the second cache entry and the second invalidation entry satisfy a second validity condition;

access a third logical clock value for the second invalidation entry;

access a fourth logical clock value for the second cache entry;

determine that a second value difference between the third logical clock value and the fourth logical clock value satisfies a threshold value; and issue an alarm indicating potential staleness of the second cache entry.

* * * * *